US010533696B2

(12) United States Patent
Baugh

(10) Patent No.: US 10,533,696 B2
(45) Date of Patent: Jan. 14, 2020

(54) METHOD OF PROVIDING A LATCH FOR PIPELINE REMEDIATION

(71) Applicant: Benton Frederick Baugh, Houston, TX (US)

(72) Inventor: Benton Frederick Baugh, Houston, TX (US)

(*) Notice: Subject to any disclaimer, the term of this patent is extended or adjusted under 35 U.S.C. 154(b) by 250 days.

(21) Appl. No.: 15/625,195

(22) Filed: Jun. 16, 2017

(65) Prior Publication Data
US 2018/0363830 A1 Dec. 20, 2018

(51) Int. Cl.
*F16L 55/46* (2006.01)
*E21B 31/00* (2006.01)
*E21B 23/00* (2006.01)
*F16C 11/06* (2006.01)
*E21B 31/12* (2006.01)
*E21B 31/18* (2006.01)
*B23P 6/00* (2006.01)
*E21B 31/14* (2006.01)
*E21B 31/20* (2006.01)
*E21B 37/04* (2006.01)
*F16L 101/12* (2006.01)
*F16L 101/30* (2006.01)

(52) U.S. Cl.
CPC .............. *F16L 55/46* (2013.01); *B23P 6/00* (2013.01); *E21B 23/00* (2013.01); *E21B 31/00* (2013.01); *E21B 31/12* (2013.01); *E21B 31/14* (2013.01); *E21B 31/18* (2013.01); *F16C 11/06* (2013.01); *E21B 31/20* (2013.01); *E21B 37/045* (2013.01); *F16L 2101/12* (2013.01); *F16L 2101/30* (2013.01); *Y10T 29/49718* (2015.01); *Y10T 29/49853* (2015.01)

(58) Field of Classification Search
CPC ...... F16L 55/46; B23P 6/00; Y10T 29/49718; Y10T 29/49853; E21B 23/00; E21B 31/12; E21B 31/06; E21B 31/00; E21B 31/20; E21B 31/18; E21B 31/14; E21B 37/045; F16C 11/06
See application file for complete search history.

(56) References Cited

U.S. PATENT DOCUMENTS

| 1,337,476 | A | * | 4/1920 | Kliewer | E21B 31/18 |
| | | | | | 294/102.1 |
| 6,045,171 | A | * | 4/2000 | McLeod | E21B 21/00 |
| | | | | | 166/98 |
| 6,122,791 | A | | 9/2000 | Baugh | |
| 6,651,744 | B1 | | 11/2003 | Crawford | |
| 7,025,142 | B2 | | 4/2006 | Crawford | |
| 7,998,276 | B1 | | 8/2011 | Baugh | |
| 9,488,022 | B2 | * | 11/2016 | Alix | E21B 31/18 |
| 2014/0224538 | A1 | * | 8/2014 | Brown | E21B 25/16 |
| | | | | | 175/44 |

FOREIGN PATENT DOCUMENTS

WO WO-2012129662 A1 * 10/2012 ............. E21B 31/18

\* cited by examiner

Primary Examiner — Jermie E Cozart

(57) ABSTRACT

The method of providing a latch which is capable of passing a relatively short radius bend in a pipeline and then engaging a fishing neck on a service tool in a pipeline, and after the latch has engaged the service tool having the ability to pass the combination back through the relatively short radius bend in the pipeline.

11 Claims, 6 Drawing Sheets

METHOD OF PROVIDING A LATCH FOR PIPELINE REMEDIATION

TECHNICAL FIELD

This method to the provision a latch which is capable of passing a relatively short radius bend in a pipeline and then engaging a fishing neck on a service tool in a pipeline, and after the latch has engaged the service tool having the ability to pass the combination back through the relatively short radius bend in the pipeline.

BACKGROUND OF THE INVENTION

Offshore pipelines typically run along the seafloor to or from offshore platforms. At the platform, the pipelines run up the legs of the pipelines in a section of pipe called a riser. The junction between the seafloor section of the pipeline and the riser is typically a bend whose radius is usually five times the pipe diameter, typically referred to 5D bends. Additionally, from the point of entry on the platform into the pipeline to the riser there may be three or four other 5D bends to pass.

The design of service tools which are to operate in these circumstances requires that they must be short enough or flexible enough to pass these bends. Flexible can come in the form of a truly flexible service tool, or ball joints spaced along a longer service tool which effectively make flexible.

An added problem occurs when one of these service tools is stranded in the pipeline and it must be recovered. Conventionally a profile called a fishing neck can be added to the end of the tool and a fishing tool can be sent into the pipeline to engage the tool. As these service tools can be in any orientation, the fishing necks are characteristically small and concentric such that they will be near the center of the pipeline.

These fishing tools to "fish" for or engage the stuck service tools must pass the 5D bends on the platform to get into the pipeline. When they approach the service tools, they must be approximately concentric with the pipeline to engage the fishing neck in spite of the effects of gravity or the end loading of the running string. The running string is usually coiled tubing or thin walled steel pipe. This tubing must also pass the 5D bends so are functionally highly stressed and bent at the time the engagement with the fishing neck occurs. The tendency of the end of the coiled tubing is to be adjacent to one side, which makes fishing operations difficult.

An added problem is that whereas the service tools must be a combination of short and flexible enough to pass the 5D bend and the fishing tool must be a combination of short and flexible enough to pass a 5D bend, when the fish is caught and is being retrieved, the combination must be short and/or flexible enough to pass the 5D bend.

Oilfield fishing tools similar to this have been used for almost 100 years, however, are characteristically run into a vertical well bore so centralizing is relatively simple and there are no short radius bends to contend with. Any bend in an oil or gas well will have a radius of greater than 100 feet.

The need for the ability to effectively enter a pipeline travelling past multiple relatively short bends has existed as long as subsea pipelines have existed. The conventional wisdom solution to this problem has been to go to the seafloor, cut the pipeline, and raise the cut end up to the surface such that you will have a straight access into the pipeline. This process is greatly complicated when there is pressure and the potential of environmental pollution.

BRIEF SUMMARY OF THE INVENTION

The object of this invention is to provide a method (or apparatus) for engaging a fishing neck on a service tool in a pipeline with an engaging tool after the engaging tool has passed through relatively short radius pipeline bend.

A second object of this invention is to provide a method of flexing the fishing tool combined with the service tool sufficiently short and or flexible enough to pass a relatively short radius bend in the pipeline.

A third objective of this invention is to allow the fishing tool to be presented proximate the centerline of the pipeline when engaging the service tool in spite of being delivered by highly stressed and bent steel pipe.

Another object of this invention is to allow a release of the fishing tool from the service tool when the service tool cannot be retrieved by the fishing tool.

Another object of the invention is to hold the fishing tool in an erect position when the engagement is to be made with the fishing neck.

Another object of the invention is to eliminate the effect of the attached coiled tubing string being bend from the fishing tool.

Another object of the invention is to eliminate the effect of the weight of the attached coiled tubing string from the fishing tool.

DETAILED DESCRIPTION OF THE INVENTION

Figure 1:
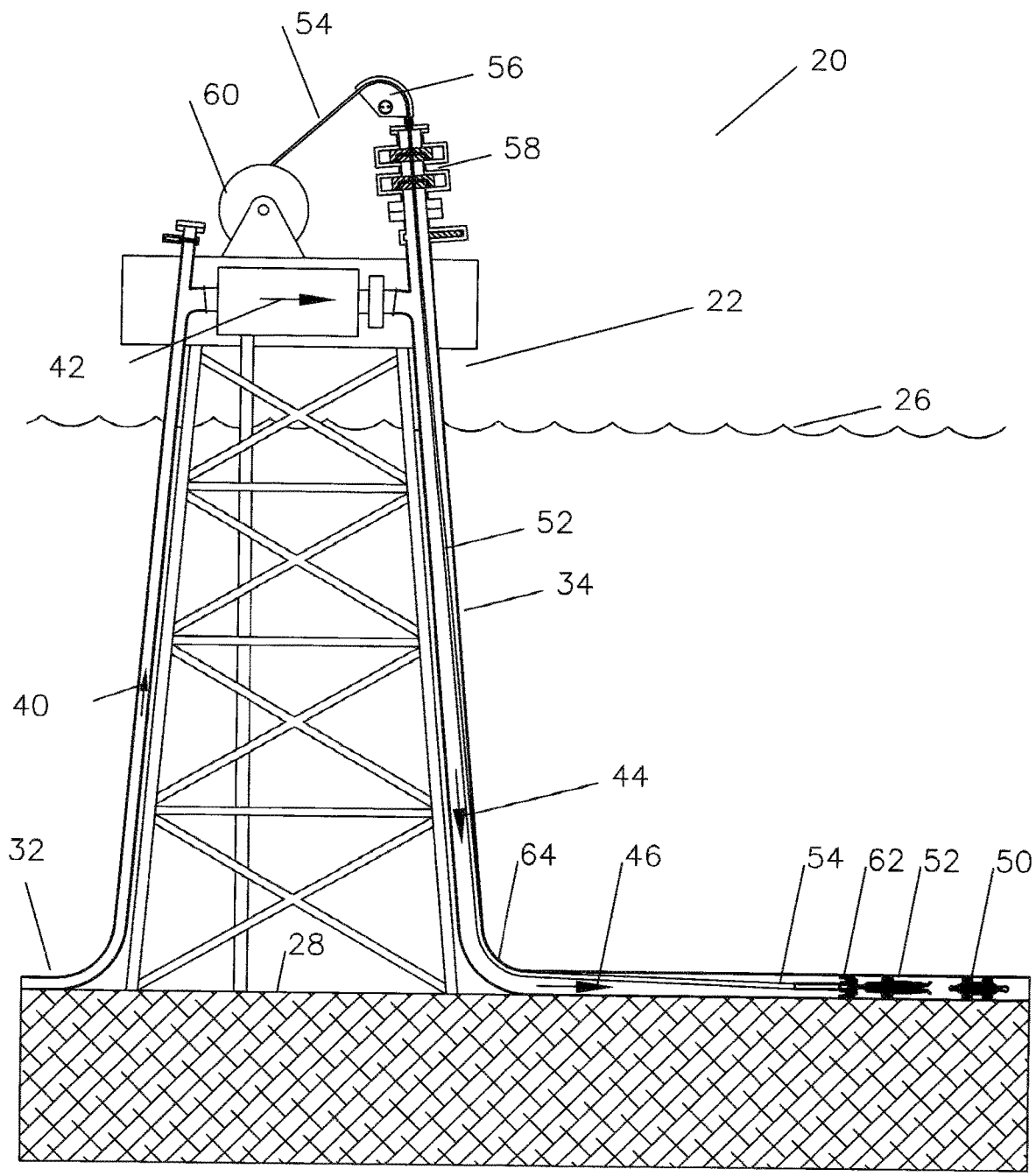
FIG. 1 is a view of an offshore platform and pipeline showing a service tool to be retrieved and a fishing assembly being deployed to retrieve it.

Referring now to FIG. 1, a view of a system 20 utilizing the present invention is shown with platform 22, the ocean surface 26, the seafloor 28, an incoming pipeline 32 which brings hydrocarbons to first platform 22 and an export pipeline 34 which takes the hydrocarbons to a delivery point which is likely the shore.

Arrows 40-46 indicate the intended flow and intended direction of the flow within the pipelines. Service tool 50 is the target of the fishing operations and is presumably stuck in the pipeline, and most likely blocking the flow. It can be any of a variety of pigs, including cleaning and inspection pigs. Fishing assembly 52 is run on coiled tubing or hose 54 goes back to injector head 56 with blowout preventers 58 and storage reel 60. Sealing cups 62 are provided on the coiled tubing or hose to allow fluid volume in the annular area between the internal bore of the pipeline and the outer dimeter of the coiled tubing or hose to move the fishing components forward towards the service tool to be retrieved. Fluid volume in front of the fishing components will be vented back up the bore of the coiled tubing or hose, presuming it cannot be simply vented at the end of the pipeline. The J-tube 64 is illustrative of the 5D bends which the tools must pass.

Figure 2:
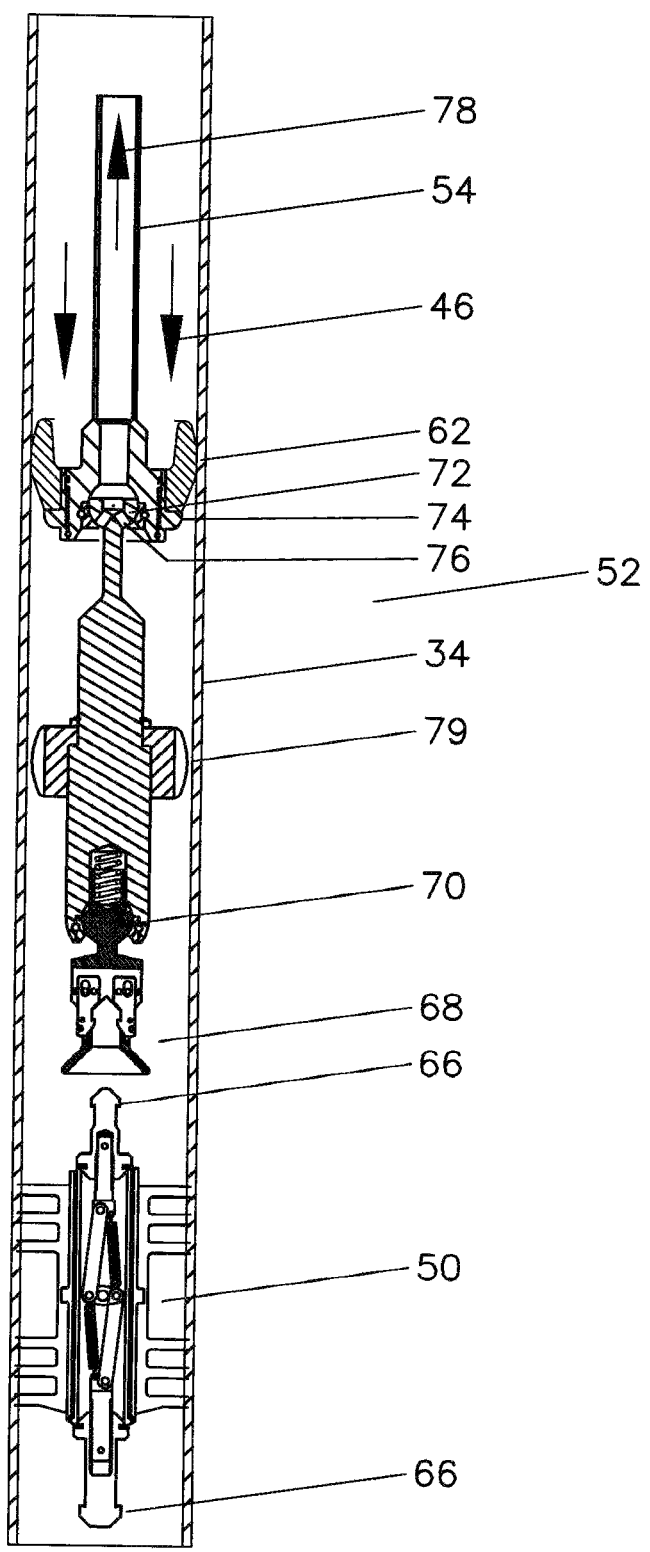
FIG. 2 illustrates a fishing assembly approaching a service tool to be retrieved.

Referring now to FIG. 2, service tool 50 is illustrated as a disk cleaning pig with a fishing neck 66 on both ends. The fishing necks 66 are arranged such that when they are pulled, internal checks are opened to allow venting thru the pig (see U.S. Pat. No. 6,122,791).

Fishing assembly 52 is the group of tools shown in the figure to retrieve the service tool 50. Fishing tool 68 is the actual fishing part of this assembly. Ball joint 70 provides flexibility and a preload mechanism to be discussed to keep the fishing tool 68 erect near the centerline of the pipeline. Ball joint 72 provides more flexibility, but more importantly removes all moment from the fishing tool which might be imparted by stress in the coiled tubing or hose 54. Spherical or cylindrical ring 74 is approximately centered with the ball joint 72 and is nearly the same outer diameter as the inner diameter of the pipeline 34. Spherical or cylindrical ring 74 means that in addition to no moment being imparted onto the fishing tool 68, the effect of the weight of the coiled tubing or hose is cancelled. As is illustrated, spherical or cylindrical ring 74 is also a part of the sealing cup 62. Ports 76 are provided through ball joint 72 to allow flow 46 which pushes the fishing assembly 52 towards the service tool 50 can return up the bore 78 of coiled tubing or hose 54.

Spherical donut or cylindrical ring 79 is added at approximately the same diameter as spherical donut or cylindrical ring 74 so the centerline of the fishing assembly 70 will be approximately parallel concentric to the centerline of pipeline 34. With the centerlines being held as parallel and concentric, and fishing tool 68 being held erect, the engagement with service tool is ready to be made.

Figure 3:
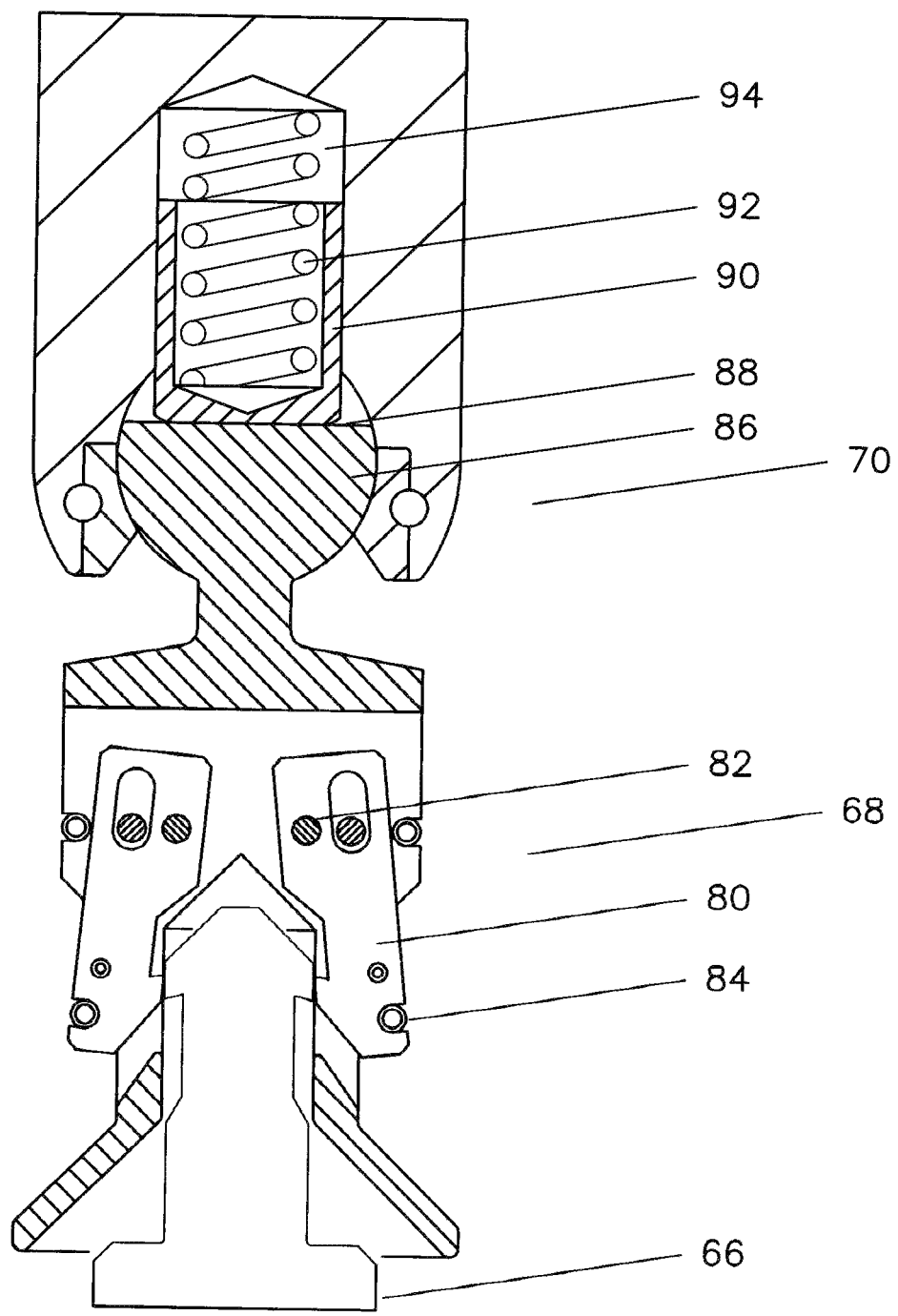
FIG. 3 illustrates a fishing tool engaging a fishing neck.

Referring now to FIG. 3, fishing tool 68 is engaging fishing neck 66 and latches 80 are being deflected outwardly about pivot/shear pin 82 against the spring loading of garter spring 84. The method of holding fishing tool 72 erect is shown on ball joint 70 which shows a truncated ball 86 with flat surface 88 being engaged by plunger 90 which is loaded by spring 92 in pocket 94. To be misaligned, it must compress spring 92, which always tries to return the fishing tool 68 to the aligned position.

Figure 4:
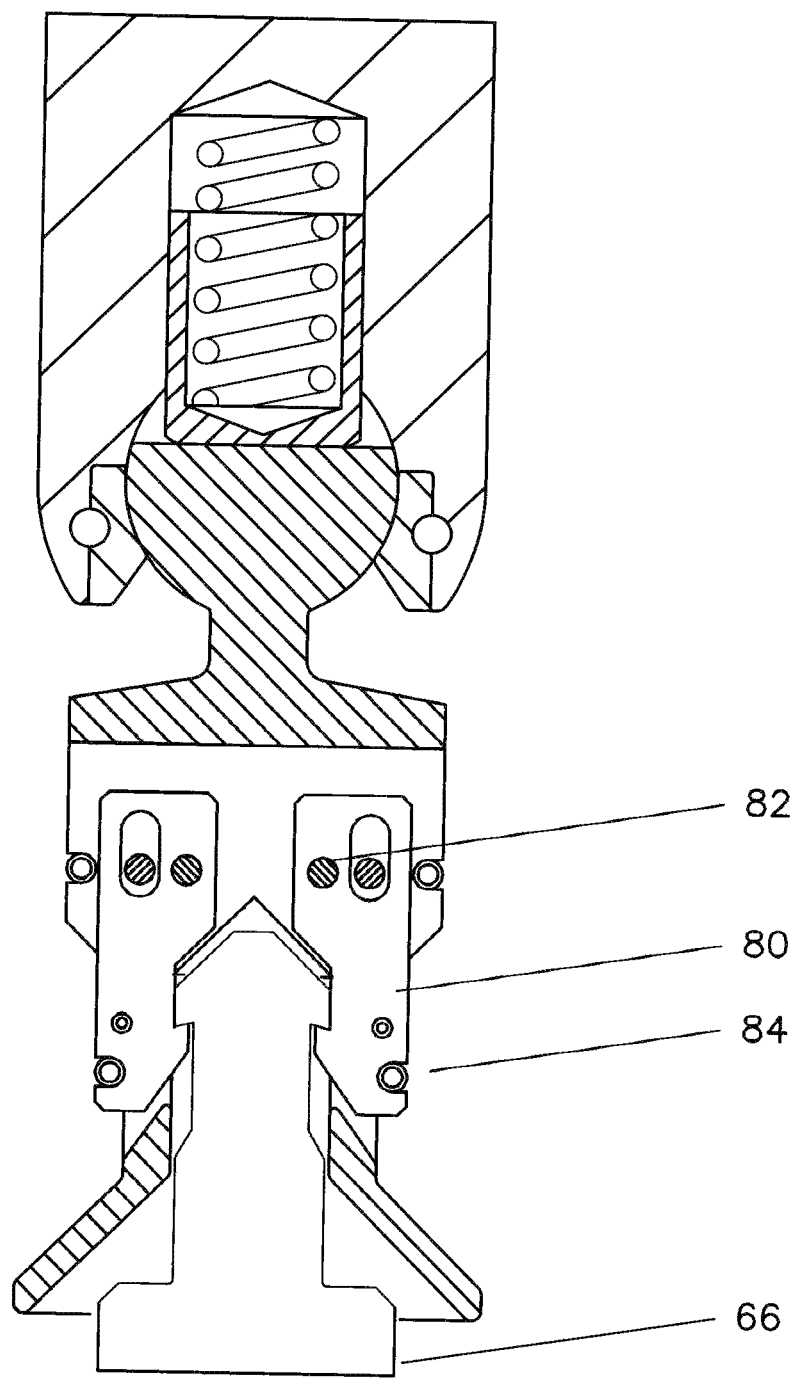
FIG. 4 illustrates the fishing tool fully engaged with the fishing neck.

Referring now to FIG. 4, fishing neck 66 is fully engaged and latches 80 have been pushed behind shoulder 100 of fishing neck 66 by garter spring 84. The catch has now been made and service tool 50 is ready to be recovered by pulling tension on the coiled tubing or hose.

Figure 5:
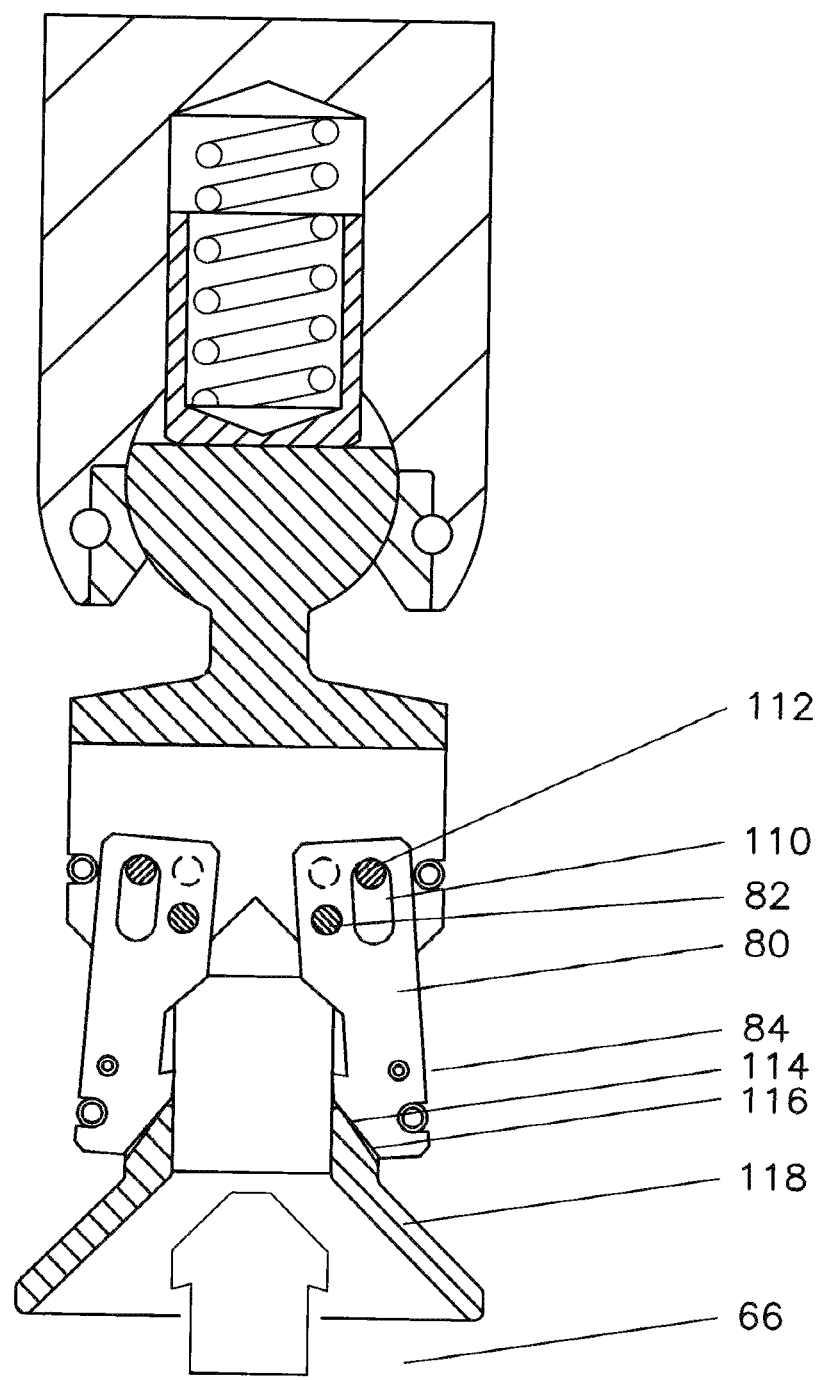
FIG. 5 illustrates a fishing neck being released from a fishing tool.

Referring now to FIG. 5, release is illustrated if the service tool 50 is stuck so tightly fishing assembly 52 cannot retrieve it. At a predetermined tension, pivot/shear pin 82 shears allowing latches 80 to move along slots 110 until the end of slot 110 contacts pin 112. As latches 80 are moving along the slots 110 tapered surfaces 114 on latches 80 contact tapered surfaces 116 of body 118, causing them to move outwardly releasing the fishing neck 66.

Figure 6:
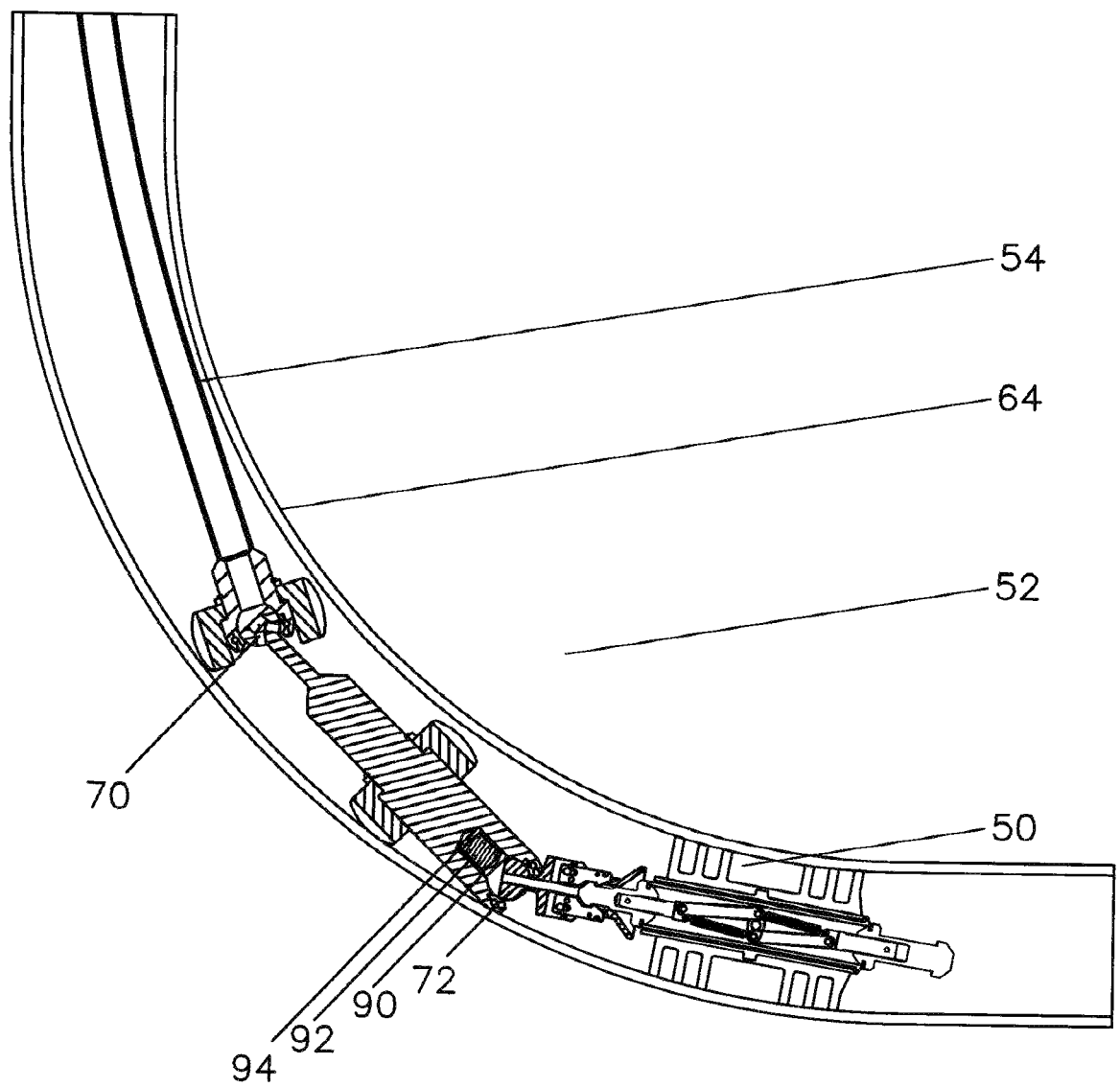
FIG. 6 illustrates a fishing assembly connected to a service tool being recovered through a 5D bend.

Referring now to FIG. 6, the combination of the fishing assembly 52 and the service tool 50 are being pulled through the 5D bend 64. Ball joints 70 and 72 are flexed to their maximum extent and coiled tubing or hose is bent again as it passes the curve. Plunger 90 with spring 92 is pushed back into the pocket 94.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

system 20
platform 22
ocean surface 26
seafloor 28
incoming pipeline 32
export pipeline 34
Arrows 40-46
Service tool 50
Fishing assembly 52
coiled tubing or hose 54
injector head 56
blowout preventers 5
storage reel 60
Sealing cups 62
J-tube 64
fishing neck 66
Fishing tool 68
Ball joint 70
Ball joint 72
Spherical or cylindrical ring 74
Ports 76
bore 78
Spherical donut or cylindrical ring 79
pivot/shear pin 82
garter spring 84
truncated ball 86
flat surface 88
plunger 90
spring 92
pocket 94
shoulder 100
slots 110
pin 112
tapered surfaces 114
tapered surfaces 116
body 118

That which is claimed is:

1. A method of connecting to a service tool in a pipeline comprising:
    having one or more fishing necks on said service tool approximately concentric with said pipeline,
    providing a latch on a fishing tool suitable to engage at least one of said one or more fishing necks,
    holding said latch approximately concentric with said pipeline,
    engaging said latch with one of said one or more fishing necks,
    providing two alignment surfaces spaced apart for maintaining a centerline approximately parallel and concentric to the centerline of said pipeline, and
    at least one of said two alignment surfaces is proximately spherical.

2. A method of connecting to a service tool in a pipeline comprising:
    having one or more fishing necks on said service tool approximately concentric with said pipeline,
    providing a latch on a fishing tool suitable to engage at least one of said one or more fishing necks,
    holding said latch approximately concentric with said pipeline, engaging said latch with one of said one or more fishing necks,
providing two alignment surfaces spaced apart for maintaining a centerline approximately parallel and concentric to the centerline of said pipeline, and
at least one of said two alignment surfaces comprises a seal which sealingly engages the inner wall of said pipeline.

3. A method of connecting to a service tool in a pipeline comprising:
having one or more fishing necks on said service tool approximately concentric with said pipeline,
providing a latch on a fishing tool suitable to engage at least one of said one or more fishing necks,
holding said latch approximately concentric with said pipeline,
engaging said latch with one of said one or more fishing necks,
providing two alignment surfaces spaced apart for maintaining a centerline approximately parallel and concentric to the centerline of said pipeline, and
urging, said latch approximately parallel and concentric to said two alignment surfaces.

4. A method of connecting to a service tool in a pipeline comprising:
having one or more fishing necks on said service tool approximately concentric with said pipeline,
providing a latch on a fishing tool suitable to engage at least one of said one or more fishing necks,
holding said latch approximately concentric with said pipeline,
engaging said latch with one of said one or more fishing necks,
providing two alignment surfaces spaced apart for maintaining a centerline approximately parallel and concentric to the centerline of said pipeline, and
allowing said latch to not be approximately parallel and concentric to said two alignment surfaces in order to pass through a bend in said pipeline.

5. The method of claim 4, further comprising said bend in said pipeline is a 5D bend.

6. The method of claim 4, further comprising providing a ball joint to allow said latch to not be approximately parallel and concentric to said two alignment surfaces in order to pass through a bend in said pipeline.

7. The method of claim 6, further comprising causing said latch to not be approximately parallel and concentric to said two alignment surfaces of said ball joint to compress a spring and
causing said spring to provide a force to restore said ball joint to be approximately parallel and concentric to said two alignment surfaces.

8. A method of connecting to a service tool in a pipeline comprising:
having one or more fishing necks on said service tool approximately concentric with said pipeline,
providing a latch on a fishing tool suitable to engage at least one of said one or more fishing necks,
holding said latch approximately concentric with said pipeline,
engaging said latch with one of said one or more fishing necks, and
providing a flex joint between said latch and said coiled tubing which is proximate to said alignment surface which is farthest from said latch.

9. The method of claim 8, further comprising said flex joint is a ball joint.

10. A method of connecting to a service tool in a pipeline comprising:
having one, or more fishing necks on said service tool approximately concentric with said pipeline,
providing a latch on a fishing tool suitable to engage at least one of said one or more fishing necks,
holding said latch approximately concentric with said pipeline,
engaging said latch with one of said one or more fishing necks,
providing said latch will automatically release from said one or more fishing neck at a predetermined force, and
said automatic release at said predetermined force is the result of shearing a shear pin.

11. A method of connecting to service tool in a pipeline comprising:
providing two alignment surfaces spaced apart for maintaining a centerline approximately parallel and concentric to the centerline of said pipeline,
providing a latch suitable to engage a fishing neck,
allowing said latch to not be approximately parallel and concentric to said two alignment surfaces in order to pass through a bend in said pipeline, and
urging said latch to be approximately concentric with said pipeline.

* * * * *